106. COMPOSITIONS, COATING OR PLASTIC.
98

UNITED STATES PATENT OFFICE.

LEO HALPER, OF CHICAGO, ILLINOIS.

COMPOSITION OF MATTER FOR MANUFACTURING BUILDING-BRICKS.

1,317,288. Specification of Letters Patent. Patented Sept. 30, 1919.

No Drawing. Application filed April 4, 1919. Serial No. 287,578.

*To all whom it may concern:*

Be it known that I, LEO HALPER, a citizen of the United States, residing at Chicago, in the county of Cook and State of Illinois, have invented certain new and useful Improvements in Composition of Matter for Manufacturing Building-Bricks, of which the following is a specification.

This invention relates to a composition of matter for use in making building brick and has for its primary object the improvement of plastic mixtures whereby their cost is cheapened, their resistance to crushing forces maximized, and they are very quickly available for use after discharge from the block press, due to their quick drying character.

My improved composition consists of a mixture of sand, crushed stone, cinders, iron, cement, and water.

In preparing the composition I prefer to use the ingredients in about the following proportions—viz., 10% of sand, 10% of crushed stone, 5% of cinders, 5% of granular iron, and 70% of cement, these comprising the 100% of dry ingredients to which is added sufficient water to make what is commonly known in the building art as a heavy mixture, that is, a mixture which is not sloppy and which does not readily flow.

In manufacturing bricks from this mixture I prefer to use clean, sharp, washed, torpedo sand; small crushed stone that will pass through a ¼ inch mesh screen; crushed cinders that will pass through a ⅛ inch mesh screen; waste granular pig-iron of the kind that flakes off of pigs of iron after they have molded in the foundry and have been handled in storing or shipping; and any ordinary form of cement purchasable in the open market. The form of pig-iron used is a waste by-product resulting in large quantities from the handling of pig-iron and readily obtainable at very low cost from smelters. After mixing these dry ingredients with sufficient water to dampen them without making a liquid of the mass, I subject the mixture, within a suitable mold, to a pressure of not less than 40 tons.

Upon removal from the mold brick formed of this mixture harden with exceeding rapidity, rendering them available for use almost immediately upon their removal from the mold.

In explanation of the term "torpedo sand" it is here stated that this is a term commonly used by architects, contractors and others working in the art of concrete construction to designate generally coarse, sharp sand. More particularly the term signifies fine particles of stone (especially silicious stone) in loose state but not reduced to powder or dust; a collection of silicious granules not coherent when wet.

The exact proportions and sizing of the above-named ingredients may be somewhat altered without departing materially from the quick-drying and anti-crushing advantages which I obtain.

I claim:

1. A composition of matter for the manufacture of building brick, comprising sand, crushed stone, screened cinders, granular iron, and cement.

2. A composition of matter for the manufacture of building brick, comprising torpedo sand, crushed stone which will pass through a ¼ inch mesh screen, crushed cinders which will pass through a ⅛ inch mesh screen, granulated waste of pig-iron and cement.

3. A composition of matter for the manufacture of building brick, comprising 10% of torpedo sand, 10% of finely crushed stone, 5% of fine crushed cinders, 5% of granular waste of pig-iron, and 70% of cement.

4. A composition of matter for the manufacture of building brick, comprising 10% of torpedo sand, 10% of fine crush stone, 5% of fine crushed cinders, 5% of granular waste of pig-iron, 70% of cement; and water in sufficient quantity to thoroughly moisten said ingredients and leave the resulting mass non-liquid.

In testimony whereof I have affixed my signature.

LEO HALPER.

Copies of this patent may be obtained for five cents each, by addressing the "Commissioner of Patents, Washington, D. C."